United States Patent [19]
Gard et al.

[11] Patent Number: 5,513,127
[45] Date of Patent: Apr. 30, 1996

[54] CONTROL SYSTEMS EMPLOYING A DATA MODEL IN A NETWORK ENVIRONMENT

[75] Inventors: Bengt E. I. Gard, Tullinge; Lars G. V. Eneroth, Bandhagen; Stefan D. Larsen, Sodertalje; Tord R. Nilsson, Stockholm, all of Sweden

[73] Assignee: Telefonaktiebolget L M Ericsson, Stockholm, Sweden

[21] Appl. No.: 312,009

[22] Filed: Sep. 22, 1994

Related U.S. Application Data

[63] Continuation of Ser. No. 757,330, Sep. 10, 1991, abandoned.

[51] Int. Cl.$^6$ ............................ G06F 9/455; G06F 13/00
[52] U.S. Cl. ............................ 364/514 C; 395/500
[58] Field of Search .................... 395/325, 200, 395/500; 364/514, 578, 514 R, 514 A, 514 B, 514 C; 371/20.1; 379/90, 94, 95, 201, 207

[56] References Cited

U.S. PATENT DOCUMENTS

| | | | |
|---|---|---|---|
| 4,106,092 | 8/1978 | Millers, II | 364/200 X |
| 4,545,011 | 10/1985 | Lyon et al. | 371/20.1 X |
| 4,747,127 | 5/1988 | Hansen et al. | 364/200 X |
| 4,928,304 | 5/1990 | Sakai | 379/94 |
| 4,937,825 | 6/1990 | Ballard et al. | 371/20.1 |
| 5,018,097 | 5/1991 | Kuhlmann et al. | 364/900 |
| 5,060,140 | 10/1991 | Brown et al. | 395/325 |

*Primary Examiner*—Emanuel T. Voeltz
*Assistant Examiner*—Edward Pipala
*Attorney, Agent, or Firm*—Jenkens & Gilchrist

[57] ABSTRACT

A communication network control system includes facilities for data driven control of components attached to the network. The network has an overall control function and each component has an individual control function. Common component control functions can be controlled via the overall control function straightaway. Uncommon component control functions are controlled via translation of subfunctions within the overall control function. Such translations are effected as required based upon information regarding individual component needs, which information is stored in a data model where it may be accessed and subsequently interpreted as part of the overall control function.

16 Claims, 7 Drawing Sheets

CONTROL SYSTEMS EMPLOYING A DATA MODEL IN A NETWORK ENVIRONMENT

This is a continuation of application Ser. No. 07/757,330, filed Sept. 10, 1991 now abandoned.

BACKGROUND OF THE INVENTION

1. Field of the Invention

The present invention relates to systems and methods for control of communication networks. More particularly, the present invention relates to systems and methods for data driven control of communication equipment.

2. Description of Related Art

In its simplest form, data communication takes place between two devices that are directly connected by some form of point-to-point transmission medium. However, in certain instances it is impractical for two devices or components to be directly, point-to-point connected. An example of such an instance is when there are a set of devices, each of which may require a link to many of the others at various times. This problem has been heretofore addressed by attaching multiple devices to a communication network. Each device, or station, is attached to a network node. The set of nodes to which stations attach is the boundary of a communication network that is capable of transferring data between two or more stations.

Communication networks may be categorized based on the architecture and the techniques used to transfer data. Two major different types of communication networks are switched networks and broadcast networks. Switched networks involve transfer of data from a source to a destination through a series of intermediate nodes that provide a switching facility to move the data from node to node. Broadcast networks involve no intermediate switching nodes; each station has a transmitter/receiver that allows communication over a common medium, so that a transmission from any one station is broadcast to and received by all other stations in the network.

As communication devices have become more complex, entities in different systems have developed the need to communicate. In a broad sense, entities include application programs, electronic mail facilities, voice telephones, and the like. Also in a broad sense, systems include computers, terminals, and the like. That is, in general, an entity may be defined to be anything capable of sending or receiving information, and a system defined to be a physically distinct object that contains one or more entities.

For two entities within a system to communicate successfully, they must speak the same language. That is, what is communicated, how it is communicated, and when it is communicated must conform to some mutually acceptable set of conventions between the entities involved. The set of conventions is referred to as a protocol, which may be defined as a set of rules governing the format and relative timing of message exchange between two entities. Functions performed by a conventional protocol include segmentation and reassembly, encapsulation, connection control, flow control, error control, synchronization, sequencing, addressing, multiplexing and transmission services, all of which functions are familiar to those skilled in the art. Protocols generally involve trade-offs of flexibility, versatility and efficiency. Compatibility is a desired attribute of protocols for practical reasons while modularity facilitates improving products.

Another concept that should be considered as background to the present invention is the concept of the network interface. The network interface is an interface towards a network, capable of connecting entities in separate systems that are not part of the network. Such entities access the network via the network interface using network access protocols. X.25 is well known to those skilled in the art as a packet-switched network access protocol standard.

As a final level to consider as part of the background of the present invention, "internets" have developed as interconnected sets of networks. Each constituent network supports communication among a number of attached devices. In addition, networks are connected by devices that may be referred to generically as "internetwork gateways". Internetwork gateways provide a communication path so that data can be exchanged between networks. A bridge is a simplified gateway that has been developed for use with homogeneous local networks. X.75 is a standard for a protocol that provides vertical circuit service across multiple X.25 networks.

A shortcoming and deficiency of the prior art that is addressed by the present invention is the lack of a system control protocol that simply but effectively coordinates subsystem protocols associated with entities within the system. That is, the prior art has heretofore lacked a system control protocol flexible enough to allow easy connection of new entities within the system and to allow easy modification (e.g., updating and enhancing) of protocols associated with such entities. Such a function is becoming more important with the advent of multi-service environments, such as the Integrated Services Digital Network ("ISDN"), and the Broadband Integrated Services Digital Network ("BISDN").

SUMMARY OF THE INVENTION

The present invention overcomes the short comings and deficiencies of the prior art by providing a communication network control system including facilities for data driven control of components attached to the network. The network has an overall control function and each component has an individual control function. Common component control functions can be controlled via the overall control function directly. Uncommon component control functions are controlled via translation of subfunctions within the overall control function. Such translations are effected as required based upon information regarding individual component needs, which information is stored in a data model where it may be accessed and subsequently interpreted as part of the overall control function.

More specifically, but still broadly stated, according to the teachings of the present invention a control system for a communication network includes means for controlling common behavior of components and means for controlling uncommon behavior of components. The means for controlling common behavior of components includes logic embedded within the overall network control function. The means for controlling uncommon behavior of components includes a data model including information regarding uncommon behavior of components, means for the network control function to access and interpret that information, and means for the network control function to subsequently tailor control orders to individual components based upon their uncommon needs.

The overall network control function knows a set of generic operations that can be directed towards a generic model component. Examples of generic operations are connect, disconnect, reserve, and release operations.

Further according to the teachings of the present invention, the data model may include translation information corresponding to the generic operations. This translation information may comprise a list of corresponding operations for each generic operation for each of the components. That is, the generic operations towards the generic model component can be translated into specific operations towards the actual component. The data model may also include addressing information. In an embodiment of the present invention this addressing information may include addressing information for adjacent components as well as for a component at hand. Further, the addressing information for adjacent components as well as the component at hand may be stored in an inter-referring manner so that the addressing information for a component at hand can be derived based upon the addressing information for at least one of the adjacent components thereto.

The present invention also provides a method for data driven control of a plurality of components forming a communication system. In such a system the plurality of components exhibit at least some common behavior, the communication system has a system control function, and each of the plurality of components has an individual control function. A method according to the teachings of the present invention includes the steps of maintaining a capacity for controlling operations involving only common behavior within the system control function, maintaining information as to uncommon requirements of each of the plurality of components within a data model, and maintaining a capacity for controlling operations involving at least some uncommon behavior. This last step includes the substeps of accessing the maintained information as to uncommon requirements of the plurality of components, determining individual component needs based upon the accessed information, and modifying generic control means within the system control function to account for determined needs of individual components.

In embodiments of the method of the present invention the operations involving only common behavior may include connect, disconnect, reserve, and release operations. With a reserve operation is here meant an operation which upon successful completion results in resources for a connection being reserved, but the connection is not yet established and data may not yet be transported on the connection. With a connect operation is here meant an operation which upon successful completion results in a fully established connection upon which data can be transported. With a disconnect operation is here meant the reverse operation of a connect operation as defined above. With a release operation is here meant the reverse operation of a reserve operation as defined above. Combinations of the operations may also be included. Also in embodiments of the method of the present invention the capacity for controlling operations involving at least some uncommon behavior may include translation information for each common behavior operation for each component.

A method according to the teachings of the present invention may also include the step of maintaining addressing information for each component. In embodiments of the method of the present invention this addressing information may include addressing information for adjacent components as well as for a component at hand, and the addressing information for adjacent components as well as the component at hand may be stored in an inter-referring manner so that the addressing information for a component at hand can be derived based upon the addressing information for at least one adjacent component.

Accordingly, it is an object of the present invention to provide a control system for a communication network that is extremely flexible.

Another object of the present invention is to provide a central control function for a communication network that should have a long useful life, which is especially important considering the difficulty and expense in developing such functions.

Still yet another object of the present invention is to provide a central control function for a communication network that is easy to maintain.

BRIEF DESCRIPTION OF THE DRAWINGS

Other objects, advantages, and novel features of the present invention will become apparent from the following detailed description of the invention when considered in conjunction with the accompanying drawings wherein.

DETAILED DESCRIPTION OF THE INVENTION

Figure 1:
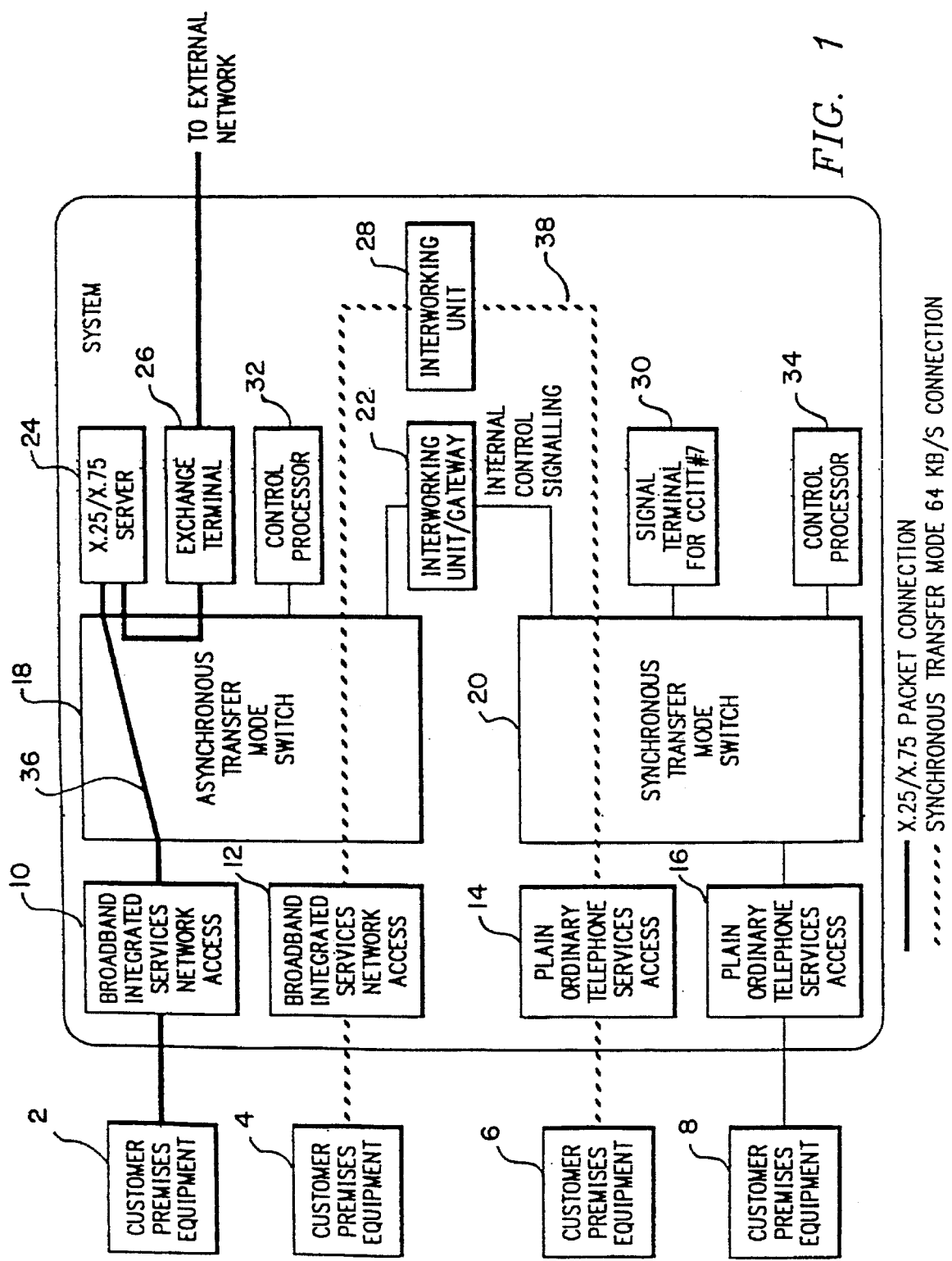
FIG. 1 is an illustration of two examples of possible connections in a conceivable telecommunication system.

Referring now to the drawings wherein like or similar elements are designated with the same reference numeral throughout the several views, and more particularly to FIG. 1, there is shown a system comprising a multitude of telecommunications devices (including switches, interworking units, transmission devices, and so on) connected in a network. Henceforth, for clarity and convenience, all of these devices will be generally referred to herein as "components". The components in the system of FIG. 1 can also be considered to be different types insofar as they may differ in the way that they can support connections of different kinds using different protocols (e.g., synchronous transfer mode, asynchronous transfer mode, and packet). Specific components shown in FIG. 1 include customer premises equipment 2, 4, 6, 8 which may include telephones, data terminals, complete PBS's or virtually any other type of equipment that could be located at a customer or subscriber. Other components shown in FIG. 1 include broadband integrated services networks access 10, 12, plain ordinary telephone services access 14, 16, asynchronous transfer mode switch 18, and synchronous transfer mode switch 20. As is well known to those skilled in the art, asynchronous transfer refers to a transfer mode wherein transmission can be effected at any time and synchronous transfer refers to a transfer mode wherein transmission can only be effected at predetermined times. Interconnecting switch 18 and switch 20 is an interworking unit/gateway 22 which, as indicated in FIG. 1, handles internal control signalling. Between the switch 18 and the exterior of the network, an exchange terminal 26 is located. To the switch 18, an X.25/X.75 server 24 is connected. Finally, the components shown in FIG. 1 also include an interworking unit 28 and a signal terminal 30. Switches 18 and 20 may also be seen to have associated control processors 32, 34, but those control processors are not formal "components" as defined above.

Two connections are explicitly shown in FIG. 1. One of the two connections is a X.25/X.75 packet connection between customer premises equipment 2 and the external network. This connection is shown via bold line 36. This connection passes through the broadband integrated services network access 10, the switch 18, the X.25/X.75 server 24, the switch 18, and the exchange terminal 26 in interconnecting the customer premises equipment 2 and the external network.

Since the different components along this path work with different protocols, the X.25 protocol is placed on the highest layer in a protocol stack at the customer premises equipment 2. This is shown in the top line of FIG. 2, where there is also shown which of the different layers are handled in which of the different components.

The second connection shown in FIG. 1 is a synchronous transfer mode 64 kb/s connection which is depicted via dashed line 38. This connection interconnects the customer premises equipment 4 and the customer premises equipment 6 and passes through the broadband integrated services network access 12, the switch 18, the interworking unit 28, the switch 20, and the plain ordinary telephone service access 14.

Figure 2:
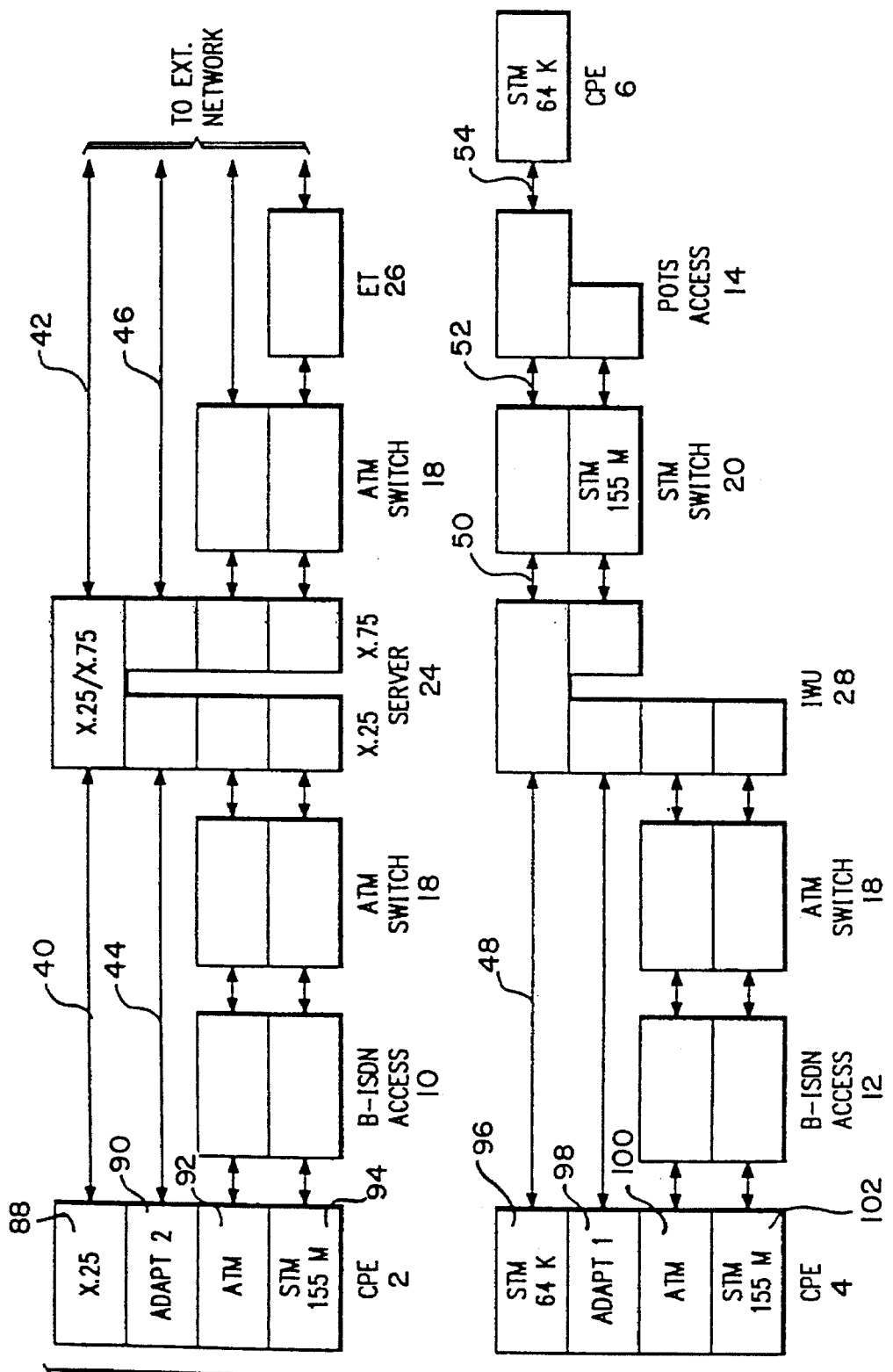
FIG. 2 is a diagram showing protocol stacks that are processed in the various different components for the connections of FIG. 1.

The lower line of FIG. 2 shows the protocol structure and where the layers are handled for this connection, in a similar way as the top line of FIG. 2 shows for the X.25/X.75 packet connection.

Although not forming so critical a part of the present invention to warrant a detailed discussion, because the concepts of packet-switching and X.25/X.75 interconnection are used extensively in examples of embodiments of the present invention discussed herein, a few comments about those two concepts follow. Packet-switching, as contrasted with circuit switching, does not involve a dedicated transmission capacity along a path through a network. Rather, data is sent in a sequence of chunks, called packets. Each packet is passed through the network from node to node along some path leading from a source to a destination. Packet-switched networks are commonly used for terminal-to-computer and computer-to-computer communications.

X.25 is one of the best known and most widely used protocol standards. X.25 specifies a data terminal equipment ("DTE")/data circuit terminating equipment ("DCE") interface. In the case of X.25 the DCE provides access to a packet-switched network, described above. The X.75 standard was developed by the International Consultative Committee on Telegraphy and Telephony ("CCITT") as a supplement to X.25. The X.75 protocol is designed to be used between public X.25 networks and is not likely to be used as an interface between public and private networks. However, X.75 may be used to connect a collection of private X.25 networks in an internet that does not include public networks.

The system shown in FIG. 1 must have an overall control function (hereinafter referred to as "FS") to be able to coordinate actions towards the components in order to establish continuous connections throughout the system. Additionally, and inherently, each individual component (hereinafter referred to as components "$K_1$" through "$K_N$") must also have an individual control function (hereinafter referred to as "$SK_1$" to "$SK_N$") in order to function properly within the overall system.

Inevitably, because of such factors as different functional requirements, different manufacturers and so on, different components with a system generally have at least partly different properties and different functionality. Such differences lead directly to variations in the control interfaces between FS and $SK_i$. There are a multitude of examples of such variations. For example, the addressing information is different for a synchronous transfer mode ("STM") component (e.g., switch 20) compared to an asynchronous transfer mode component (e.g., switch 18). Such addressing information can also be different between different designs of components within the same family (e.g., different STM switches). As another example, some components have the capability to support point-to-multi-point branching, while others do not. This capability or lack thereof must be reflected on the control interface. As yet another example, some components are internally congestion-free, making it possible to reserve transmission capacity through the component by reserving capacity on its inputs and outputs. In such a case it may be suitable to exploit this property by dividing the connection establishment process into two phases, a "reservation phase" and a "through-connection phase", which will be visible in the control interface for the component. In other cases, this is not possible because the component is not internally congestion-free, so that reservation of capacity can only be accomplished by through-connecting.

The present invention teaches a method and apparatus for avoiding the requirement of FS having a detailed knowledge of a large number of control interfaces towards $SK_i$. Heretofore such a detailed knowledge has been the result of the different properties of different components $K_i$ within systems, including such components with possibly wholly new properties that may be introduced well into the lifeline of the overall system. The apparatus and method of the present invention involves building only basic common behavior recognition and dealing into FS. Descriptions of variations from this basic common behavior are put into a data model memory, which descriptions are effectively tied to individual components $K_i$. FS is structured or programmed to read and interpret the description in the data model and to use its interpretations of individual component needs to modify, tailor, or select proper control orders to be delivered to an individual component. In summary, and very succinctly, FS is structured to use "data driven control" against $SK_i$.

Figure 3:
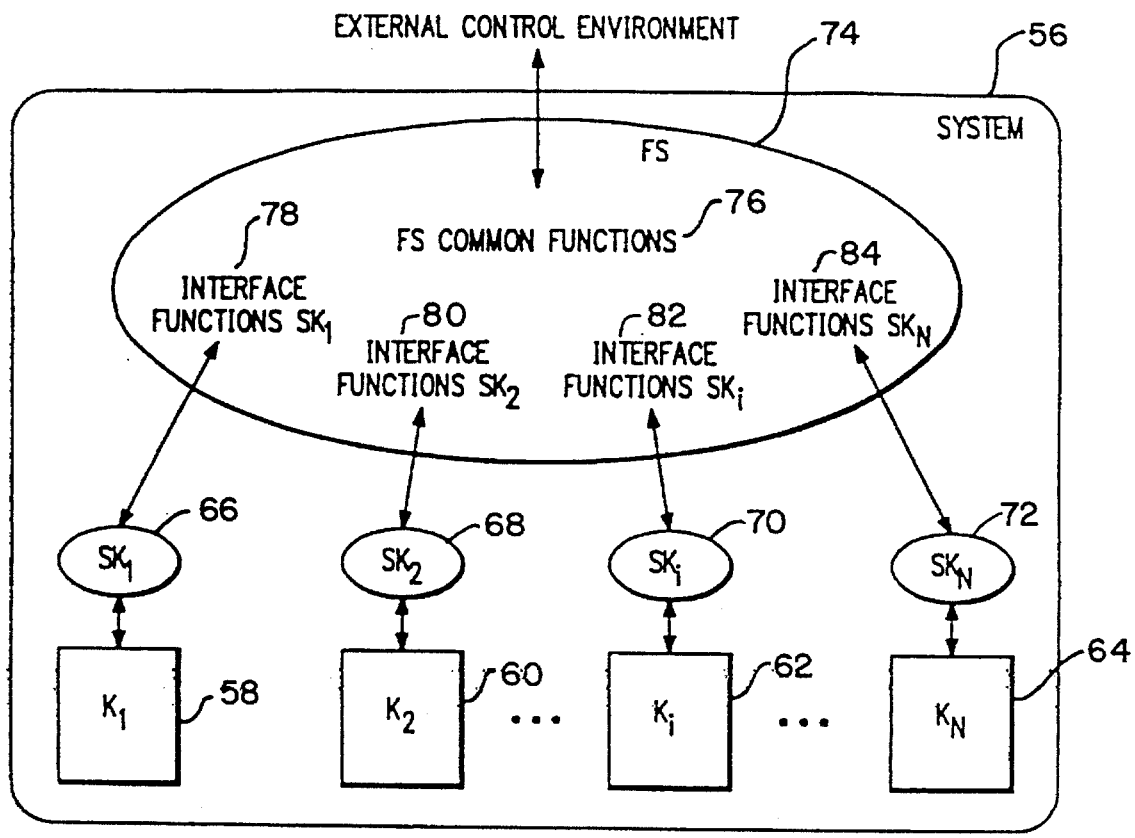
FIG. 3 is a block diagram of a communication system arranged contrary to the teachings of the present invention.
Figure 4:
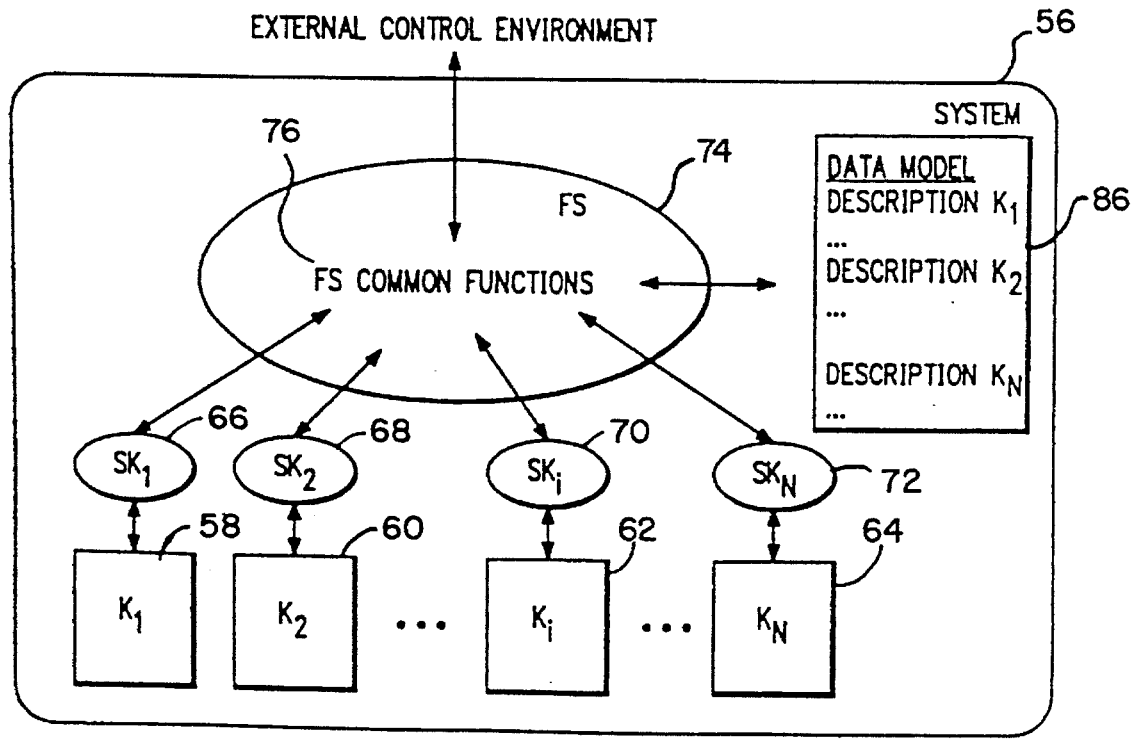
FIG. 4 is a block diagram of a communication system arranged according to the teachings of the present invention.

FIGS. 3 and 4 are useful in understanding the general concept of the present invention FIGS. 3 and 4 are similar insofar as they depict a system 56 connected to an external control environment. The systems of FIG. 3 and 4 are also similar in that the systems 56 comprise N components $K_1$–$K_N$ (examples of which are shown and designated with reference numerals 58, 60, 62 and 64 in the two FIGS.), each of which components has an associated individual control function $SK_1$–$SK_N$ (examples of which are shown and designated with reference numerals 66, 68, 70 and 72 in the two FIGS.). Still further, the systems of FIGS. 3 and 4 are similar in that the systems 56 have overall control functions 74 that perform common control functions 76 relative to the individual components $K_i$. The systems of FIGS. 3 and 4 are different, however, and the difference between them is an important aspect of the present invention. The system of FIG. 3, which may be considered how not to design a system according to the teachings of the present invention, includes specific interface functions 78, 80, 82, 84 for each component $K_i$ within the common function FS 74. In other words, all functions necessary to control uncommon behavior of the components $K_i$ is included within FS.

The system of FIG. 3 has a number of defects. First of all, the system of FIG. 3 is not flexible. System changes (e.g., adding or modifying a component) requires changes in the control function FS 74. As a matter of practice, changing FS 74 is difficult and expensive. Second, the system of FIG. 3 can only with great difficulty be made to have a long life, which is an important characteristic of such systems. For instance, telecommunication switching systems typically have a lifetime of several decades. The many changes which will inevitably occur over time (e.g., adding of new components with wholly new functions) will rapidly make FS 74 complicated, unwieldy, relatively slow, difficult to maintain, and the like.

Referring now to FIG. 4, shown therein is a system designed according to the teachings of the present invention. As previously mentioned, and in common with the system of FIG. 3, common control functions 76 can be handled by the overall control function FS 74 straightaway. Uncommon control functions; that is, any and all functions that all of the components $K_i$ 58, 60, 62, 64 do not each perform; are not so handled, however. Rather, within system 56 is a data model 86, which data model 86 includes information or descriptions regarding each component $K_i$. The overall control function FS 74 can access this data model 86, extract and interpret information from it, and then use that data to control uncommon behavior of a particular component. This latter control may be effected in a number of ways. One way would be for the control function 74 to modify a generic, common command to make it effective in controlling uncommon behavior of a particular component. Another way would be for the control function 74 to substitute an appropriate command to control uncommon behavior for some similar, generic, common command. This latter way could be readily effected via a translation table wherein appropriate substitute commands are tabulated with similar generic commands so as to be located, drawn out, and used when use of an uncommon command is appropriate or necessary.

Those skilled in the art should now readily and fully appreciate how the system of FIG. 4 is markedly superior to the system of FIG. 3. It is much easier to add new components to and modify components within the system of FIG. 4. This is because system changes affect only the respective $K_i$ and $SK_i$ together with the information in the data model 86, but not FS 74. This is a very important property because telecommunication systems in general, and telecommunication system control functions in particular, tend to become very complex, and difficult and expensive to develop and maintain. These factors make system long life with minimal changes important characteristics. The system of the present invention, as generally shown in FIG. 4, provides these characteristics by reducing the direct effects of system changes on FS 74.

Figure 5:
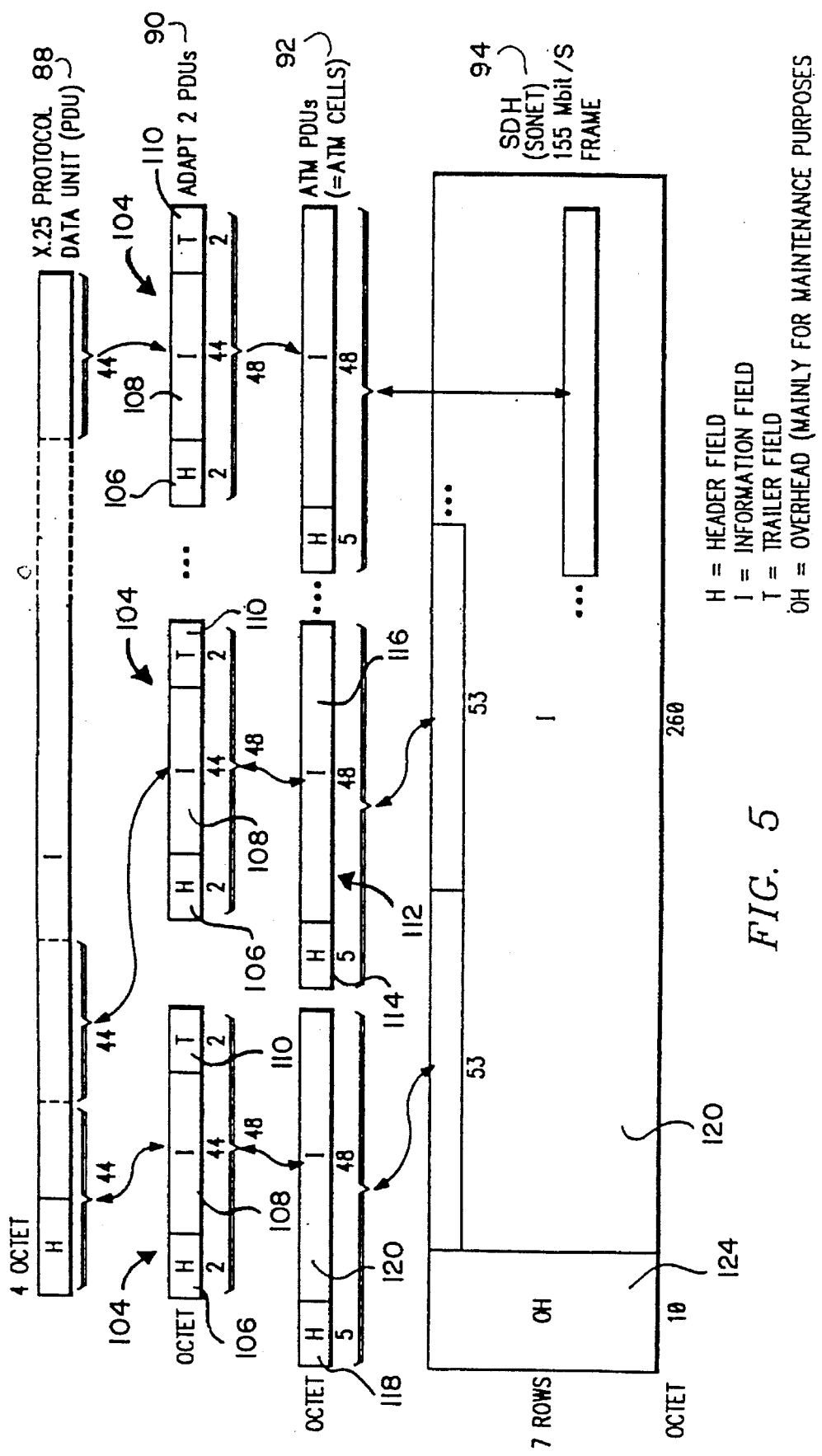
FIG. 5 shows the mapping of information between the different protocol layers for an X.25 Packet connection with its underlying protocol layers at the point between the customer premises equipment 2 and the access component 10 of FIG. 1 (which connection is also shown in FIG. 1 via a bold line)
Figure 6:
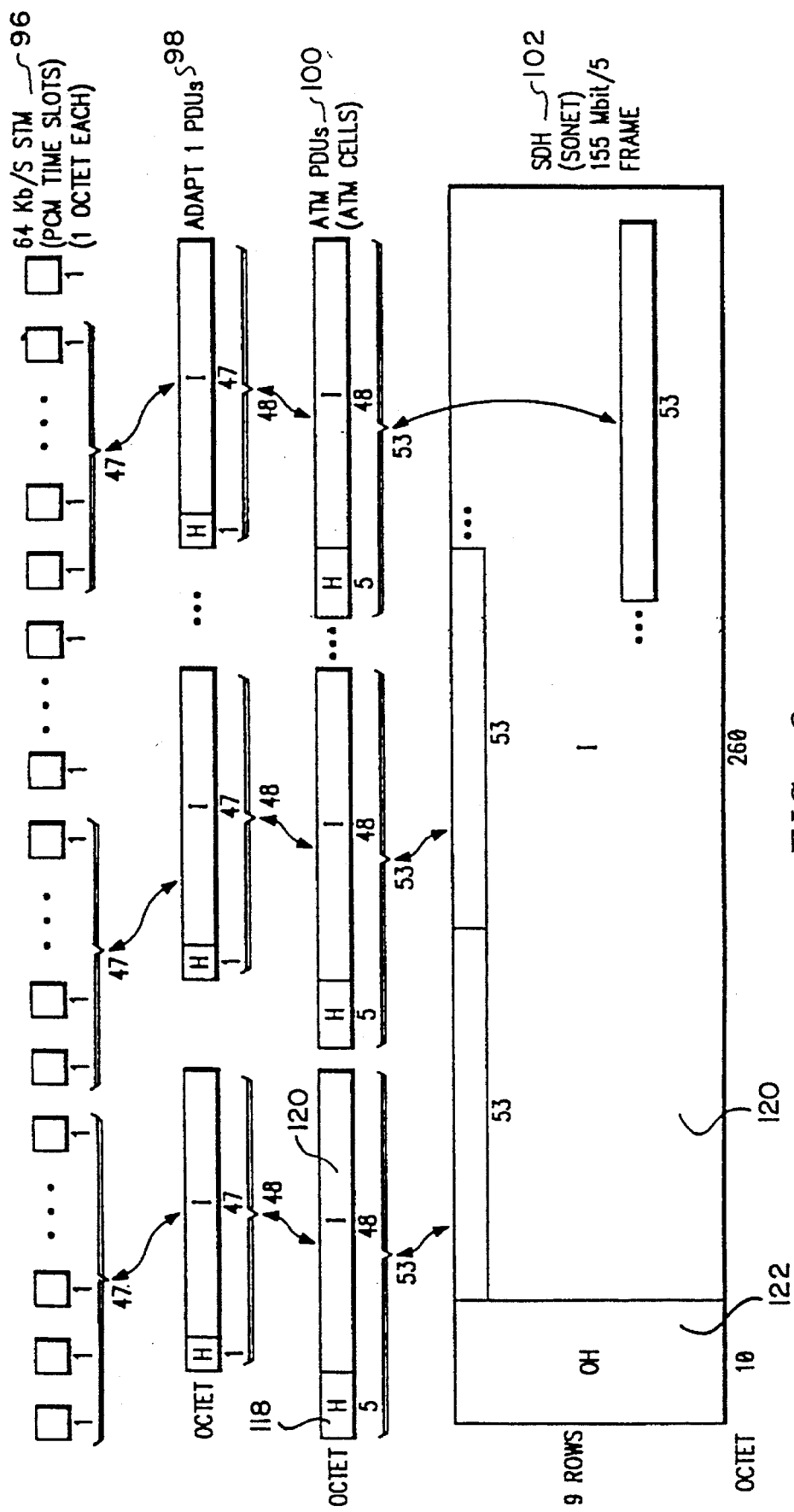
FIG. 6 shows the mapping of information between the different protocol layers for a 64 Kb/s STM (circuit connection) with its underlying protocol layers at the point between the customer premises equipment 4 and the access component 12 of FIG. 1 (which connection is also shown in FIG. 1 via a dashed line)

FIGS. 5 and 6 and included herein to further understanding of the system of FIGS. 1 and 2, in which system the method of the present invention may readily be practiced. Referring back to FIG. 2, it will be noticed that multiple protocols are set forth at certain points, i.e., customer premises unit 2 can communicate via protocols X.25, Adapt 2, ATM, and STM 155 M (each of these separate protocols being designated by reference numerals 88, 90, 92, and 94 in FIG. 2). Similarly, customer premises unit 4 can communicate via protocols STM 64 K, Adapt 1, ATM, and STM 155 M (each of these separate protocols being designated by reference numerals 96, 98, 100, and 102 in FIG. 2). As is well known to those skilled in the art, multiple protocols are used by a single entity to communicate on various different levels. As a matter of engineering practice, different levels or layers have been identified and are used by those skilled in the art to define the metes and bounds of discrete areas that may be worked within, while connectivity in a modular fashion to other layers is not disturbed. For example, layers used in a widely accepted protocol layer architecture include, from lower to higher layers, physical, data link, network, transport, session, presentation and application layers. The physical layer, the lowest layer, is concerned with the transmission of unstructured bit streams over a physical medium. The data link layer, a higher layer, is concerned with sending blocks of data (frames) with the necessary synchronization, error control, and flow control. The network layer is concerned with establishing, maintaining, and terminating connections. The various other layers have different, increasingly "higher" responsibilities. In FIGS. 5 and 6, the underlying protocol layers for equipment 2 and 4, respectively, are shown in greater detail. In FIG. 5, for example, the data formats of the various protocol layers 88, 90, 92, 94 of the X.25/X.75 packet connection are shown as they appear at a point between equipment 2 and access component 10 of FIG. 1. Packets of information (e.g., packets 104) may generally be seen to comprise header, information and trailer fields (e.g., fields 106, 108, and 110, respectively). There are variations, however. For example, at the ATM level 92, the packets (e.g., packet 112) includes only header and information fields (e.g., fields 114 and 116, respectively). These variations, and indeed the specifics of all of the protocols mentioned herein, are well known to those skilled in the art and, hence, are not discussed in further detail herein.

FIG. 6 may be seen to be structured similarly to FIG. 5 except that the synchronous transfer mode 64 kb/s connection is featured and data formats of the protocol layers as they appear between the customer premises equipment 4 and the access component 12 of FIG. 1 are shown. Header, information and overhead fields (e.g., fields 118, 120 and 122) have counterparts in FIG. 5.

FIGS. 5 and 6 are useful to those skilled in the art as they illustrate possible mapping between the different protocol layers heretofore discussed. It should be appreciated from the discussion of protocol layers above that while such layers have different concerns, they also have the common requirement of transferring a particular amount of data in a particular instance. Having such a common purpose leads directly to the fact that groupings of data must be the same (or must "correspond") between various layers. The making of such a correspondence is called mapping. The double headed arrows in FIGS. 5 and 6 illustrate how such mapping can be effected within customer premises equipment 2 and 4, respectively. It is important to understand that the mapping and protocols shown in FIGS. 5 and 6 (and, derivatively, from FIG. 2) are examples only. These mappings and protocols can be used very effectively in embodiments of the present invention according to international standards. However, the primary purpose of these examples should be understood to be to illustrate a typical environment of a system according to the teachings of the present invention. At the same time, the examples illustrate the general types of functionality a system according to the teachings of the present invention has to provide. Still further, FIGS. 5 and 6 together with FIGS. 1 and 2 illustrate that different components (e.g., component 18 versus component 24) may have somewhat different functionality since they deal with different protocol layers. There are, of course, other differences.

According to the teachings of the present invention, an external user can perform various operations towards a telecommunications system. Such a user can establish, change status on, and release connections through the network making up the system. He can express his wishes using a set of generic operations, working on (potential) connections.

The function FS, using the component descriptions in the data model, translates these generic operations into operations that are valid for the individual components. The component description for a particular component contains the specific operation (s) that corresponds to each applicable generic operation.

Below are shown some examples of possible generic operations and possible counterparts for three components. It is important to realize that these are only examples chosen to illustrate the principle of storing component specific translation information in the data model (i.e., element 86 in FIG. 4); the type of information is not limited to what is shown in the examples.

Examples of Possible Generic Operations

Reserve
Connect
Reserve and Connect
Disconnect
Disconnect and Release
Release

With a reserve operation is here meant as operation which upon successful completion results in resources for a connection being reserved, but the connection is not yet established and data may not yet be transported on the connection. With a connect operation is here meant an operation which upon successful completion results in a fully established connection upon which data can be transported. With a disconnect operation is here meant the reverse operation of a connect operation as defined above. With a release operation is here meant the reverse operation of a reserve operation as defined above. As indicated above, combinations may also be included.

Examples of Possible Translation Information

Possible translation information corresponding to the generic operations above is shown for the components K1–K3.

Generic Operation: Reserve

Corresponding operation(s) component K1: Reserve

Corresponding operation(s) component K2: Reserve and Connect

Corresponding operation(s) component K3: Reserve

Generic Operation: Connect

Corresponding operation(s) component K1: Connect

Corresponding operation(s) component K2: Not applicable

Corresponding operation(s) component K3: Connect

Generic Operation: Reserve and Connect

Corresponding operation(s) component K1: Reserve and Connect

Corresponding operation(s) component K2: Reserve and Connect

Corresponding operation(s) component K3: Reserve+ Connect (2 operations)

Generic Operation: Disconnect

Corresponding operation(s) component K1: Disconnect

Corresponding operation(s) component K2: Not applicable

Corresponding operation(s) component K3: Disconnect

Generic Operation: Disconnect and Release

Corresponding operation(s) component K1: Disconnect and Release

Corresponding operation(s) component K2: Disconnect and Release

Corresponding operation(s) component K3: Disconnect+ Release (2 operations)

Generic Operation: Release

Corresponding operation(s) component K1: Release

Corresponding operation(s) component K2: Disconnect and Release

Corresponding operation(s) component K3: Release

Another type of information that can be stored in the data model (i.e., element 86 in FIG. 4) is the detailed addressing information (channel numbers, time slot numbers, etc.) that the component needs for operations on a (potential) connection. This information can be stored structured so that, given the corresponding information for the corresponding inlet/outlet on the adjacent component, the applicable addressing information for the component at hand can be deduced.

Figure 7:
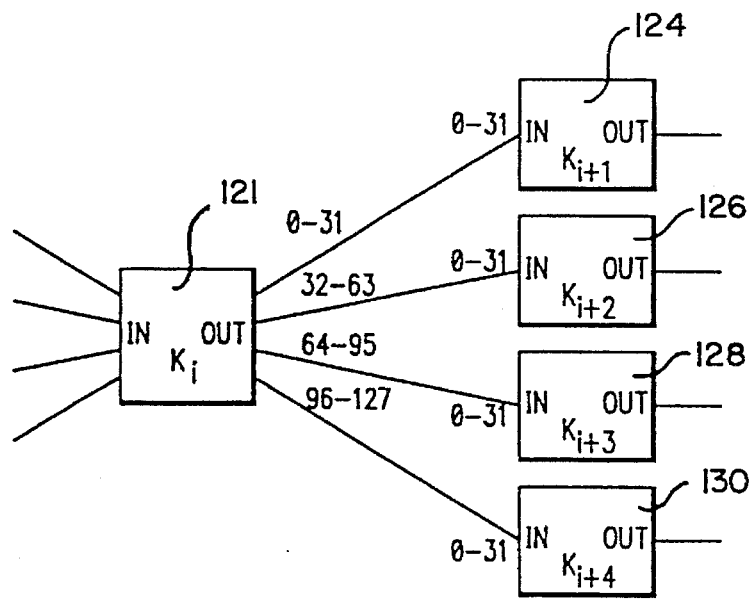
FIG. 7 is a block diagram showing five components, $K_i$–$K_{i+4}$, and the relationships between the addressing schemes used for these components.

FIG. 7 shows five components, $K_i$–$K_{i+4}$, 121, 124, 126, 128, 130 and the relationships between the addressing schemes used for these components. (Note: Only the addressing structure for one "side" of the components is shown.) All five components are assumed to handle 64 kb/s STM (circuit) connections. The components are interconnected with 2.048 Mb/s unidirectional transmission lines, each carrying 32 64 kb/s channels ("time slots"). For $K_i$, the time slots are addressed sequentially over all physical outlets. Time slots 0–31 belongs to physical outlet 1, slots 32–63 to physical outlet 2, and so on. For $K_{i+1}$ to $K_{i+4}$, the time slots are numbered 0–31 for each component inlet; they only have one. This means that the time slot which is addressed as number 70 for component K1 corresponds to number 6 for component $K_{i+3}$.

Example of Possible Corresponding Translation Information

Component $K_i$:

Address used for adjacent component $K_{i+1}$=N; address to use for $K_i$=N

Address used for adjacent component $K_{i+2}$=N; address to use for $K_i$=N+32

Address used for adjacent component $K_{i+3}$=N: address to use for $K_i$=N+64

Address used for adjacent component $K_{i+4}$=N: address to use for $K_i$=K+96

Component $K_{i+1}$

Address used for adjacent component $K_i$=N: address to use for $K_{i+1}$=N

Component $K_{i+2}$

Address used for adjacent component $K_i$=N: address to use for $K_{i+2}$=N–32

Component $K_{i+3}$

Address used for adjacent component $K_i$=N: address to use for $K_{i+3}$=N–64

Component $K_{i+4}$

Address used for adjacent component $K_i$=N: address to use for $K_{i+4}$=N–96

It is important to realize that what is shown are only examples chosen to illustrate the principle of storing component specific translation information in the data model 86; the type of information which may be stored in the data model 86 is not limited to what is shown above. The information can also be structured in a different way than what is shown here.

Figure 8:
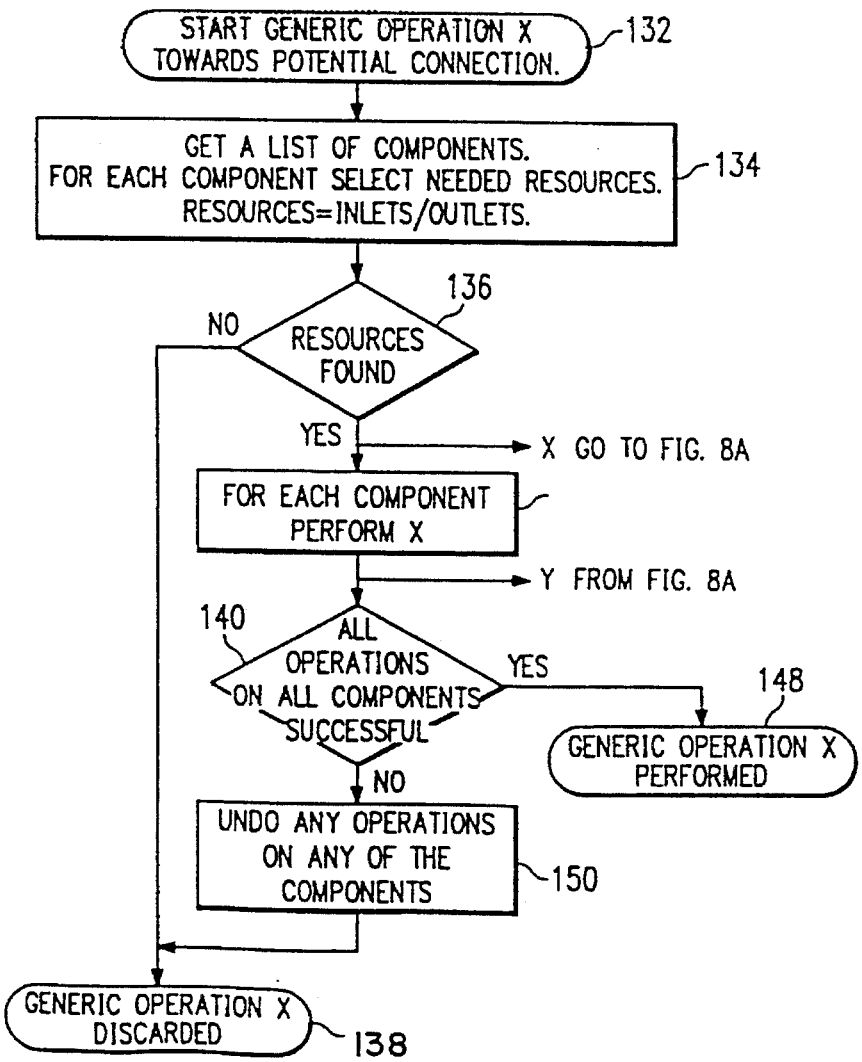
FIGS. 8 and 8A are flow charts illustrating logic underlying data driven control of telecommunications equipment.

Referring now to FIG. 8, depicted therein is a flowchart of logic that may be employed within an overall control function FS in practice of the method of the present invention. In describing this flowchart, as an additional example, the flow for establishment of a X.25/X.75 Packet connection will be specifically discussed.

The flowchart begins with start of a generic operation X, operating on potential connections (element 132). With reference to establishment of a X.25/X.75 Packet connection illustrated in FIG. 9, the generic operation is "Reserve and Connect" between an inlet S1 and an outlet S2. Channels on the inlet are in this example assumed to be selected by the user (that is, the customer premises equipment). Other selection principles are possible. By way of example, channels on an inlet S1 (LCN-s1 for the X.25 protocol and VPI-s1 and VCI-s1 for the ATM protocol) may be considered to be those channels selected by the user.

Figure 9:
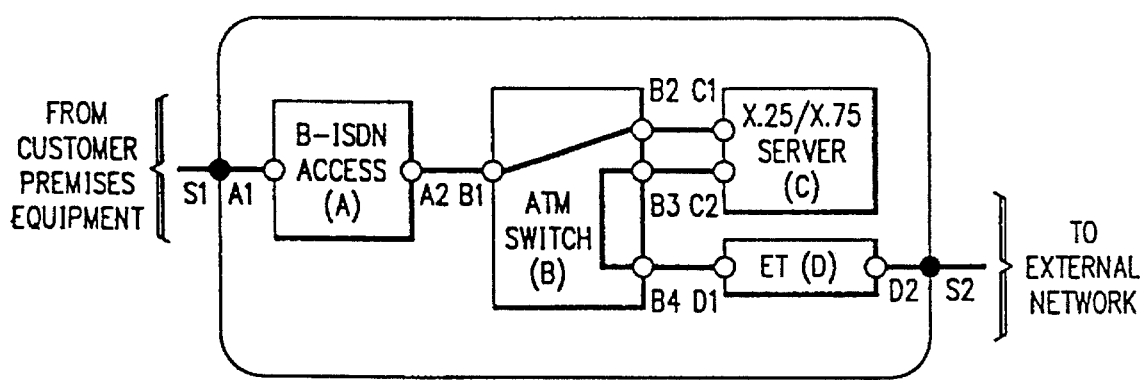
FIG. 9 is a diagram illustrating the establishment of an X.25/X.75 packet connection.

Next, as indicated by block 134, a list of components is obtained (e.g., components A, B, C, and D shown in FIG. 9). Then, resources, i.e., inlets and outlets, are selected. These selected resources may be designated as resources A1, A2, B1, B2, C1, C2, B3, B4, D1 and D2. If resources are not found (this query is indicated by element 136), the generic operation X is discarded (element 138). If resources are found, then the logic flow continues.

For each component (see block 137), then, the following actions are taken. First, a decision is made as to which addressing format is to be used towards the component. The previous component identification and channel (s) identification (s) are translated to an actual component identification and channel(s) identifications using information in the data model (element 86 in FIG. 4). With reference to the example being discussed, and with further reference to component A, this would involve system inlet S1 from the CPE with channels (VPI-s1, VCI-s1 and LCN-s1) being translated to component A, inlet A1 with channels VPI-a1 and VCI-a1. With respect to component B, this would involve component A, outlet A2 with channels (VPI-a2 and VCI-a2) being translated to component B, inlet B1 with channels (VPI-b1 and VCI-b1). With respect to component C, this would involve component B, outlet B2 with channels (VPI-b2 and VCI-b2) being translated to component C, inlet C1 with channels (VPI-c1 and VCI-c1 and by the user specified LCN-c1). Again, with respect to component B, this would involve component C, outlet C2 with channels (VPI-c2 and VCI-c2 and LCN-c2) being translated to component B, inlet B3 with channels (VPI-b3 and VCI-b3). Finally, with respect to component D, this would involve component B, outlet B4 with channels (VPI-b4 and VCI-b4) being translated to component D, inlet D1 (no channel exists) and system outlet S2 being translated to outlet D2. All of the foregoing comes within block 142 in FIG. 8.

After the immediately preceding step 142, a decision is made as to which operations are to be executed towards a given component when providing generic operation X to the user. This step is accomplished by fetching component specific data from the data model 86. In the specific example of establishment of a X.25/X.75 packet connection being discussed, this step involves deciding to execute the operation "Reserve and Connect" towards components A, B, B again, and D. This step also involves deciding to execute two separate operations, "Reserve" and "Connect", towards component C. This portion of the flowchart is depicted by block 144.

Then, as indicated by block 146, corresponding specific operations for a specific component $K_i$ are performed. In the example being discussed, with regard to component A, parameters for the "Reserve and Connect" operation will be inlet A1 with channels VPI-a1 and VCI-a1 and outlet A2. The component will select channels (VPI-a2 and VCI-a2) for outlet A2. With regard to component B, the parameters will be inlet B1 with channels VPI-b1 and VCI-b1 and outlet B2. The component will select channels (VPI-b2 and VCI-b2) for outlet B2. With regard to component C, the parameters for the Reserve operation will be inlet C1 with channels (VPI-c1 and VCI-c1 and LCN-c1) and outlet C2. The component will select channels (VPI-c2 and VCI-c2 and LCN-c2) for outlet C2. The parameters for the Connect operation will be the identification for reserved connection. Again, with respect to component B, the parameters will be inlet B3 with channels (VPI-b3 and VCI-b3) and outlet B4. The component will select channels (VPI-b4 and VCI-b4) for outlet B4. Finally, with respect to component D, the parameters will be inlet D1 and outlet D2.

Once all of the foregoing is completed, as per element 148 in the flowchart of FIG. 8, the generic operation is provided. In the example being discussed, the generic operation "Reserve and Connect" of a X.25/X.75 packet connection is provided. In response to the system, the selected channels are provided (VPI-s2 and VCI-s2 and LCN-s2). If any of the operations towards the components is unsuccessful (this query is indicated by element 140), any operations performed on any of the components are undone (element 150) and the generic operation discarded.

Figure 8A:
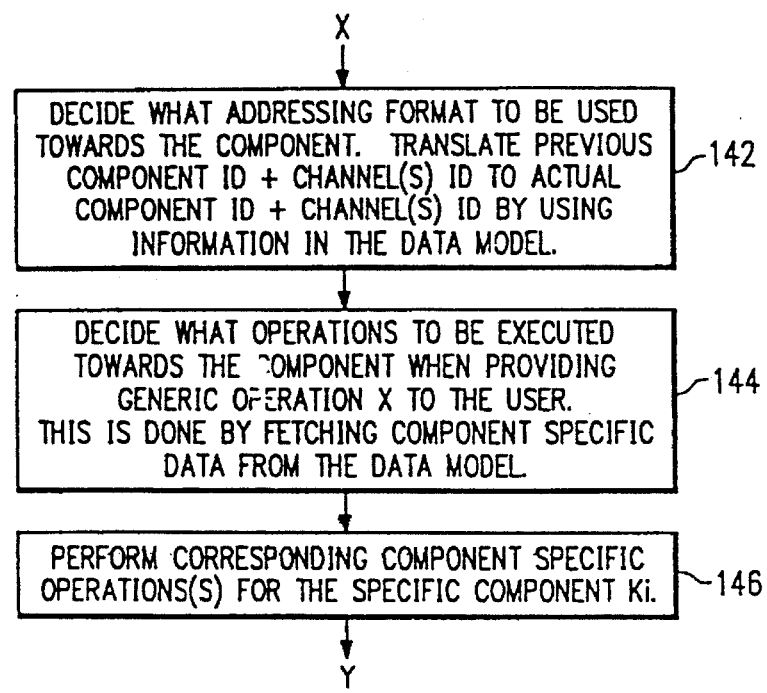

In this example, it has been assumed that channel identifications are selected by the components in the order by which they are operated (here in a "left-to-right" fashion). This is not a limitation of the system of the present invention and other selection principles are possible. It is also assumed that all of the functions 142, 144, 146 of FIG. 8A are performed for component A before component B and so on. That is in the example the order is 142, 144, 146 for component A, then 142, 144, 146 for component B, and so on. This is dependent on the channel identification selection principle used, and is not a limitation of the system of the present invention. If the selection principle is changed, the order of the operations may also change. Information regarding the order of selection and operation is stored in the data model 86 of FIG. 4.

Those skilled in the art should now fully appreciate that and how the method and apparatus of the present invention provide a markedly improved control system for communication networks as compared to prior art systems. The method and apparatus of the present invention are flexible, and should have a long life in use. The method and apparatus of the present invention make it very easy for components to be added and/or modified in communications networks, a common occurrence. Practice of the teachings of the present invention minimize the impact of such changes on the overall control function FS in communication networks.

Those skilled in the art will recognize that many modifications and variations besides those specifically mentioned my be made in the structure and techniques described herein without departing from the concept of the present invention. Accordingly it should be appreciated that, within the scope of the appended claims, the present invention may be practiced otherwise than as specifically described herein.

What is claimed is:

1. A control system for a communication network including a plurality of components exhibiting at least some common behavior, said communication network having a network control function, certain ones of said plurality of components having an individual control function exhibiting uncommon control behavior, said control system comprising:

first means for controlling network operations using said network control function by transmitting control orders to effectuate the establishment of a network communications connection between at least two of the components in accordance with the common behaviors of the connected components; and second means for controlling network operations using said network control function comprising:

a data model including information regarding uncommon behavior of the individual control functions of said plurality of components;

means for accessing said data model to extract information as to uncommon behavior of said plurality of components;

means for interpreting the information extracted from said data model to tailor the transmitted control orders to account for the uncommon behavior of the individual control function for a given one of the components and effectuate the establishment of a network communications connection between that given component having uncommon behavior and another one of the components in the network.

2. A control system as recited in claim 1, wherein said control orders comprise orders to perform network communications connect and disconnect operations.

3. A control system as recited in claim 2, wherein said control orders further comprise orders to perform a network communications release operation.

4. A control system as recited in claim 3, wherein said control orders further comprise orders to perform a network communications reserve operation.

5. A control system as recited in claim 1, wherein said data model comprises translation information corresponding to said control orders.

6. A control system as recited in claim 5, wherein said translation information comprises a list of tailored control orders for the uncommon behaviors corresponding to the control orders for the common behaviors.

7. A method for data driven control of a plurality of components forming a communication network, said plurality of components exhibiting at least some common behavior, said communication network having a network control function, certain ones of said plurality of components having an individual control function exhibiting uncommon behavior, said method comprising the steps of:

first controlling of network operations using said network control function by transmitting control orders to effectuate the establishment of a network communications connection between at least two of the components in accordance with their common behaviors;

maintaining information as to uncommon behavior of the individual control functions of said plurality of components within a data model;

second controlling of network operations using said network control function comprising the steps of:

accessing said data model to extract the maintained information as to uncommon behavior of said plurality of components; and interpreting the extracted information to tailor the transmitted control orders to account for the uncommon behavior of the individual control function for a given one of the components and effectuate the establishment of the network communications connection between that given component having uncommon behavior and another one of the components in the network.

8. A method for data driven control as recited in claim 7, wherein said control orders comprise orders to perform communications connect, disconnect, reserve and release operations.

9. A method as recited in claim 8, wherein said step of interpreting comprises the step of translating control orders for each common behavior to tailored control orders for uncommon behaviors.

10. A communications system, comprising:

a plurality of network components, each network component having a component control function, each component control function including common control elements shared by each network component in the plurality of network components, and uncommon control elements not shared by each of the plurality of network components;

means for storing information relating to the uncommon control elements of the component control function for each of the plurality of network components in an accessible data model; and a network controller connected to the plurality of network components, said network controller handling the establishment of a network communications connection between at least two of the plurality of network components using the common control elements of the component control functions, and further including:

means for accessing the means for storing to retrieve the information from the data model relating to the uncommon control elements;

means for interpreting the retrieved information; and means for handling the establishment of the network communications connection between a certain one of the plurality of network components and another one of the components using the uncommon control elements of the component control functions for the certain network component in accordance with the interpreted information from the data model.

11. The communications system as in claim 10 wherein the establishment of the network connection comprises network communications connect, disconnect, release and reserve operations between the network components, and the information stored in the data model comprises uncommon connect, disconnect, release and reserve operation translation information.

12. The communications system as in claim 11 wherein the establishment of the network connection further comprises network component addressing operations, and the information of the data model comprises network component addressing information.

13. A method for controlling a communications system, the system including a plurality of network components, each network component having a component control function, each component control function including common control elements shared by each network component in the plurality of network components, and uncommon control elements not shared by each of the plurality of network components, the method comprising the steps of:

storing a data model comprising information relating to the uncommon control elements of the component control functions for each of the plurality of network components;

handling the establishment of a network communications connection between at least two of the network components in the communications system using the common control elements of the component control functions for the plurality of network components;

accessing the data model to retrieve the information from the data model relating to the uncommon control elements;

interpreting the retrieved information; and handling the establishment of the network communications connection between a certain one of the network components in the communications system and another one of the components using the uncommon control elements of the component control functions for the network component in accordance with the interpreted information from the data model.

14. The method as in claim 13 further including the step of updating the stored data model with information accounting for the uncommon control elements of the component control functions for a reconfiguration of the communications system caused by adding to, deleting from or substituting for certain ones of the network components in the communications system.

15. The method as in claim 13 wherein the establishment of the network connection comprises network communications connect, disconnect, release and reserve operations between the network components, and the information stored in the data model comprises uncommon connect, disconnect, release and reserve operation translation information.

16. The method as in claim 15 wherein the establishment of the network connection further comprises network component addressing operations, and the information of the data model comprises network component addressing information.

* * * * *

UNITED STATES PATENT AND TRADEMARK OFFICE
CERTIFICATE OF CORRECTION

PATENT NO. : 5,513,127

DATED : Apr. 30, 1996

INVENTOR(S) : Gard et al.

It is certified that error appears in the above-indentified patent and that said Letters Patent is hereby corrected as shown below:

Title Page, Item [54],
Title               Replace "SYSTEMS"
                        With --SYSTEM--

Column 1, line 1    Replace "SYSTEMS"
                        With --SYSTEM--

Column 5, line 2    Replace "PBS's"
                        With --PBX's--

Column 6, line 51   Replace "lifeline"
                        With --lifetime--

Column 8, line 19   Replace "keen"
                        With --been--

Column 9, line 63   Replace "the"
                        With --three--

Column 10, line 66  Replace "K1"
                        With --Ki--

Column 11, line 12  Replace "K+96"
                        With --N+96--

UNITED STATES PATENT AND TRADEMARK OFFICE
CERTIFICATE OF CORRECTION

PATENT NO. : 5,513,127
DATED : Apr. 30, 1996
INVENTOR(S) : Gard et al.

It is certified that error appears in the above-indentified patent and that said Letters Patent is hereby corrected as shown below:

Column 16, line 10   Before "network"
Insert --certain--

Signed and Sealed this

Twenty-third Day of December, 1997

Attest:

BRUCE LEHMAN

Attesting Officer       Commissioner of Patents and Trademarks